(12) United States Patent
Sawant et al.

(10) Patent No.: US 9,884,275 B2
(45) Date of Patent: *Feb. 6, 2018

(54) SPIN-ON FILTER WITHOUT A NUT PLATE

(71) Applicant: Cummins Filtration IP, Inc., Columbus, IN (US)

(72) Inventors: Anil I. Sawant, Pune (IN); Loick Menez, Fouesnant (FR); Chirag D. Parikh, Madison, WI (US); Gerard Malgorn, Quimper (FR)

(73) Assignee: Cummins Filtration IP, Inc., Columbus, IN (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/019,139

(22) Filed: Feb. 9, 2016

(65) Prior Publication Data

US 2016/0158675 A1 Jun. 9, 2016

Related U.S. Application Data

(63) Continuation of application No. 13/603,721, filed on Sep. 5, 2012, now Pat. No. 9,283,500.

(Continued)

(51) Int. Cl.

| *B01D 29/21* | (2006.01) |
|---|---|
| *B01D 35/30* | (2006.01) |
| *B01D 27/08* | (2006.01) |

(52) U.S. Cl.
CPC .............. *B01D 29/21* (2013.01); *B01D 27/08* (2013.01); *B01D 35/30* (2013.01); *B01D 35/306* (2013.01);

(Continued)

(58) Field of Classification Search
CPC .. B01D 29/21; B01D 35/30; B01D 2201/295; B01D 2201/302; B01D 2201/34;

(Continued)

(56) References Cited

U.S. PATENT DOCUMENTS

| 5,484,466 A | 1/1996 | Brown et al. |
| 5,556,542 A | 9/1996 | Berman et al. |

(Continued)

FOREIGN PATENT DOCUMENTS

| CN | 101861193 A | 10/2010 |
| DE | 10 2007 017 091 A1 | 10/2008 |

(Continued)

OTHER PUBLICATIONS

Merriam-Webster online dictionary definition of "attach," retrieve done Sep. 1, 2015, URL: http://www.merriam-webster.com/dictionary/attach.

(Continued)

*Primary Examiner* — Fred Prince
(74) *Attorney, Agent, or Firm* — Foley & Lardner LLP

(57) ABSTRACT

A spin-on filter that eliminates the use of a nut plate and reduces the number of separate components. Instead, the spin-on filter utilizes the end plate of the filtercartridge to perform a number of functions, including closing the open end of the filter shell, sealing between the dirty and clean fluid sides, sealing between the filter and the mounting head to prevent leakage outside the filter to environment, attaching the filter cartridge to the shell, and sealing the end of the filter media.

18 Claims, 12 Drawing Sheets

Related U.S. Application Data

(60) Provisional application No. 61/531,207, filed on Sep. 6, 2011.

(52) U.S. Cl.
CPC .. *B01D 2201/295* (2013.01); *B01D 2201/302* (2013.01); *B01D 2201/34* (2013.01); *B01D 2201/342* (2013.01); *B01D 2201/347* (2013.01)

(58) Field of Classification Search
CPC ............. B01D 2201/342; B01D 27/08; B01D 2201/347; B01D 35/306
USPC .................. 210/437, 442, 443, 444, DIG. 17
See application file for complete search history.

(56) References Cited

U.S. PATENT DOCUMENTS

| | | | |
|---|---|---|---|
| 5,702,602 A | 12/1997 | Brown et al. | |
| 5,772,881 A | 6/1998 | Stockhowe et al. | |
| 5,817,234 A | 10/1998 | Dye et al. | |
| 5,891,336 A | 4/1999 | Vijlee et al. | |
| 6,110,365 A | 8/2000 | Bartels et al. | |
| 6,159,261 A | 12/2000 | Binder et al. | |
| 6,585,894 B1 | 7/2003 | Gebert et al. | |
| 6,599,342 B2 | 7/2003 | Andress et al. | |
| 6,966,981 B2 | 11/2005 | Binder et al. | |
| 7,041,158 B1 | 5/2006 | Chilton et al. | |
| 7,090,708 B2 | 8/2006 | Winter et al. | |
| 7,237,681 B2 | 7/2007 | Brieden et al. | |
| 7,300,486 B1 | 11/2007 | Kirsch | |
| 7,434,697 B2 | 10/2008 | Bagci et al. | |
| 7,614,504 B2 | 11/2009 | South et al. | |
| 7,731,845 B2 | 6/2010 | Lampert et al. | |
| 7,740,679 B2 | 6/2010 | Ehrenberg | |
| 7,815,705 B2 | 10/2010 | Ehrenberg | |
| 7,882,961 B2 | 2/2011 | Menez et al. | |
| 2003/0146143 A1 | 8/2003 | Roll et al. | |
| 2004/0140254 A1* | 7/2004 | Merritt ................... B01D 27/08 210/232 |
| 2005/0178716 A1 | 8/2005 | Suri | |
| 2005/0178717 A1 | 8/2005 | Bagci et al. | |
| 2006/0127198 A1 | 6/2006 | Bobed | |
| 2006/0219626 A1 | 10/2006 | Dworatzek et al. | |
| 2009/0127198 A1 | 5/2009 | Slavador et al. | |

FOREIGN PATENT DOCUMENTS

| | | |
|---|---|---|
| EP | 1 354 617 A1 | 10/2003 |
| FR | 2762230 | 10/1998 |
| WO | WO 96/12550 | 5/1996 |
| WO | WO-2006/078587 | 7/2006 |

OTHER PUBLICATIONS

Search Report and Written Opinion issued for PCT Application No. PCT/US2012/053840, dated Jan. 30, 2013, 8 pages.

Extended European search report issued for European patent application No. 12829602.7, dated Jun. 15, 2015.

First Office Action issued for Chinese Patent Application No. 201510419062.0 and English translation dated Jun. 3, 2016, 9 pages.

Communication pursuant to Article 94 (3) EPC, issued by the European Patent Office for European Patent Publication No. 12 829 602.7, dated Sep. 8, 2017, 5 pages.

\* cited by examiner

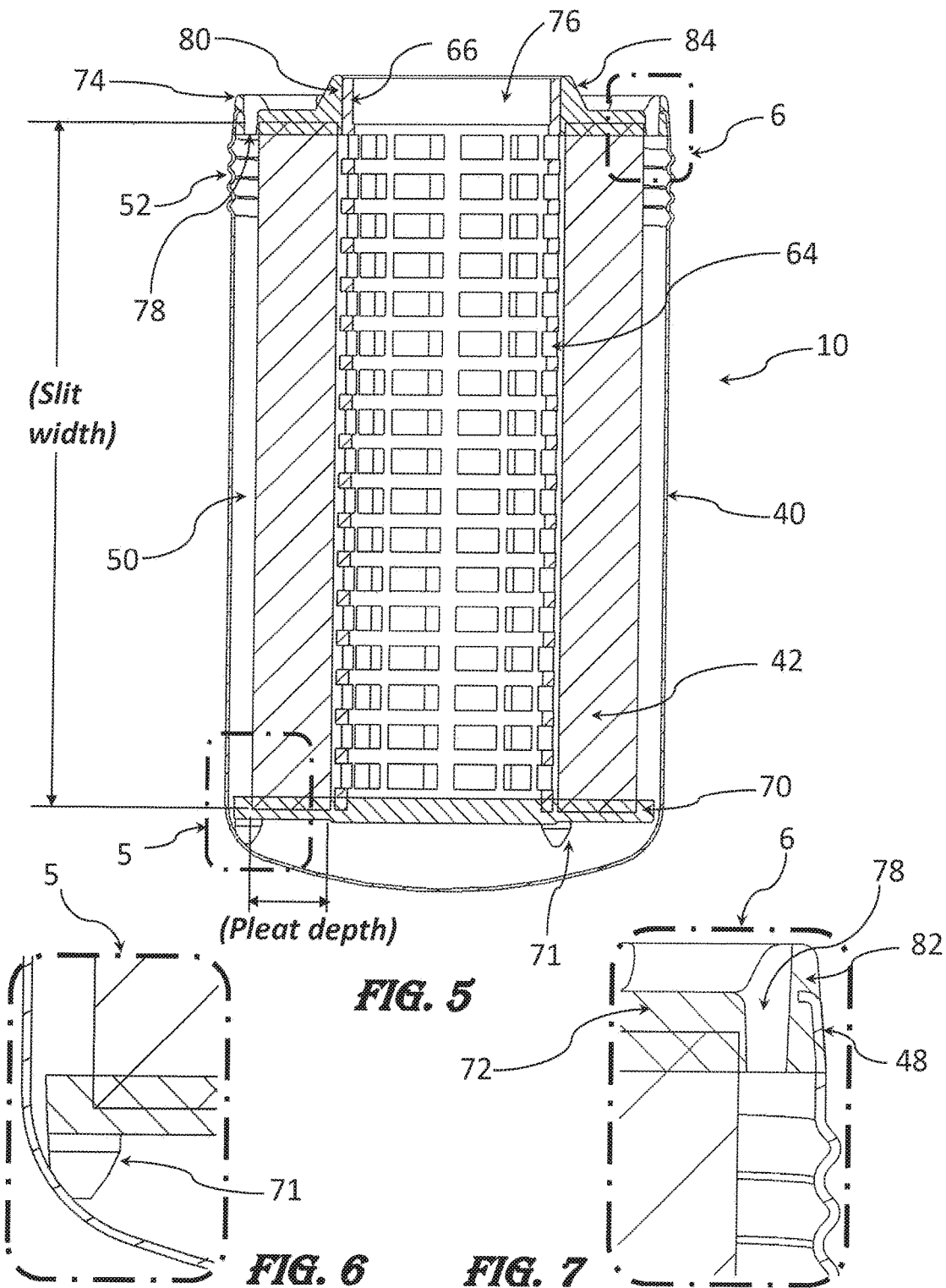

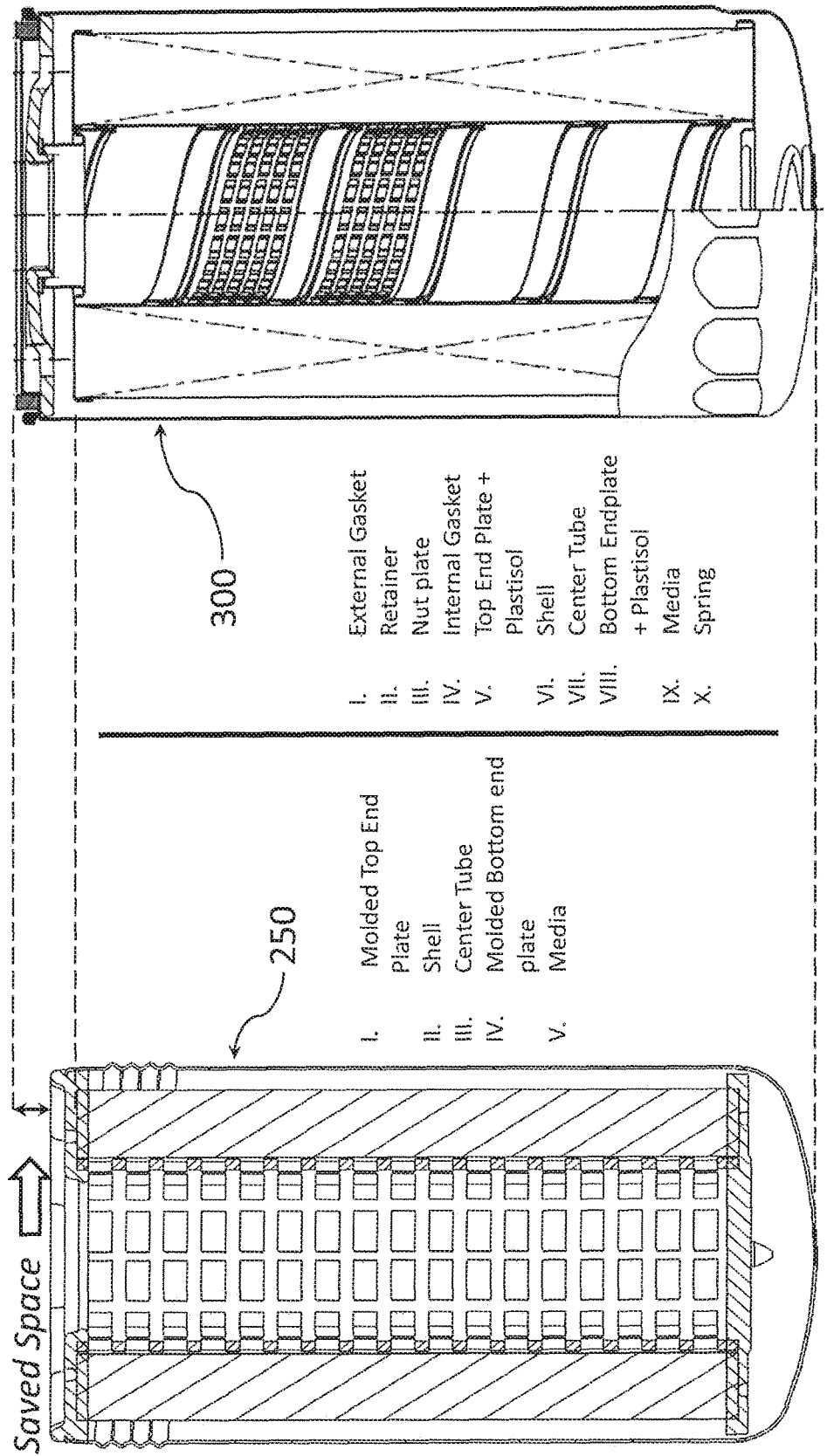

SPIN-ON FILTER WITHOUT A NUT PLATE

CROSS-REFERENCE TO RELATED APPLICATIONS

The present application is a continuation of U.S. patent application Ser. No. 13/603,721, filed Sep. 5, 2012, which claims priority to U.S. Provisional Patent Application No. 61/531,207, filed Sep. 6, 2011. The contents of both applications are incorporated herein by reference in their entirety.

FIELD

This disclosure relates generally to a spin-on filter for use in fluid, for example oil or fuel, filtration that is configured for attachment to a mounting head without the use of a nut plate commonly used on filters of this type.

BACKGROUND

Typical spin-on fluid filters according to some prior art designs are mounted to the mounting head by the use of an internally-threaded metal nut plate. The nut plate is anchored to the filter shell and includes at least one flow inlet and a flow exit. A spin-on filter with a nut plate often includes a large number of components that are required to form the filter which increases the cost and assembly complexity of the filter.

Some known spin-on fluid filters eliminate the nut plate. Examples include U.S. Pat. Nos. 7,434,697 and 7,614,504.

Whether or not the spin-on filter includes a nut plate, sealing must be provided between the head and the filter to prevent leakage outside the filter to environment, and sealing must be provided between the flow inlet and the flow exit to prevent leakage of unfiltered fluid from the inlet to the filtered fluid outlet. These sealing functions are typically provided by separate parts of the filter, including the use of installed sealing gaskets.

Improvements to spin-on filters are desirable.

SUMMARY

A spin-on filter is described that eliminates the use of a nut plate and reduces the number of separate components. Instead, the spin-on filter utilizes the top end plate of the filter cartridge to perform a number of functions, including closing the open end of the filter shell, sealing between the dirty and clean fluid sides, sealing between the filter and the mounting head to prevent leakage outside the filter to environment, attaching the filter cartridge to the shell, and sealing the end of the filter media.

The filter is less expensive to fabricate, including cost savings by eliminating many of the components found in traditional spin-on filters. The reduced number of components also helps to reduce the weight of the filter. In addition, by integrating the multiple functionalities in the top end plate, separate sealing gaskets are avoided while providing a unique interface design. Also, eliminating the nut plate allows more space availability at the top of filter which can be utilized for maximized slit width or compact filter design.

In one embodiment, the spin-on filter includes a shell having a closed end and an open end. The shell includes threads adjacent the open end that are configured to connect the shell to a mounting head. A filter cartridge is disposed within the shell that includes filter media suitable for filtering a fluid, including but not limited to oil or fuel such as diesel fuel. An end plate is attached to the filter media and is positioned adjacent to and closes the open end of the shell. The end plate has a perimeter edge that is attached to an end of the side wall of the shell which fixes the cartridge to the shell, a central fluid passageway in fluid communication with an inner space of the filter media, and a plurality of fluid passageways positioned between the perimeter edge and the central fluid passageway that are in fluid communication with the interior space of the shell. The end plate can also include first and second seals that are integrally formed therewith. The first seal is located adjacent to and is circumferentially continuous around the central fluid passageway to enable sealing with the mounting head to seal dirty fluid entering the filter from filtered fluid exiting the filter. The second seal is located adjacent to the perimeter edge and is circumferentially continuous on the end plate to enable sealing with the mounting head to prevent fluid leakage between the filter and the mounting head.

The various functions of the end plate of the filter cartridge discussed above can be used separately from one another or in any combination of the functions. For example, the end plate can close the open end of the filter shell and can be used to attach the filter cartridge to the shell, but sealing is provided by seals other than seals integrally formed on the end plate. In another example, the end plate can include integral seals for sealing between the dirty and clean fluid sides and sealing between the filter and the mounting head to prevent leakage outside the filter to environment, and the end plate can substantially close the end of the filter shell, but the cartridge can be fixed to the shell in a manner other than by using the end plate. Other combinations of functions are possible for the end plate.

The end plate can be formed of any material that is suitable to permit the first and second seals to perform their intended sealing functions. For example, the end plate can be formed of plastisol, polyurethane, a plastic with polyurethane, or other plastic material.

The perimeter edge of the second end plate can be attached to the shell in any manner that is suitable for fixing the cartridge to the shell. The attachment can be detachable to permit replacement of the filter cartridge, or permanent in which case the entire filter will be disposed of. Examples of attachments include, but are not limited to, a snap fit connection between the perimeter edge and the shell, spin welding the side wall of the shell to the perimeter edge, or molding the perimeter edge with the end of the side wall of the shell.

The threads used to connect the filter to the mounting head can be exterior threads or interior threads. The threads can be integrally formed on the side wall or can be formed on an attachment cap that is disposed adjacent to the open end of the shell and that is rotatable relative to the shell.

The improved spin-on filter described herein has two main subassemblies, namely the filter cartridge and the shell. In addition, the top end plate of the filter cartridge is configured to perform a number of functions, many of which were performed by separate components in prior spin-on filter designs. Therefore, the number of component parts of the filter is reduced compared to prior spin-on filter designs, which reduces cost. In addition, using the top end plate to close the open end of the shell permits an increase in filter media area that can be used.

BRIEF DESCRIPTION OF THE DRAWINGS

FIG. 5 is a cross-sectional view of the filter of FIG. 1 showing the increase in slit width and pleat depth.

FIG. 6 is a close-up view of the portion contained in box 5 in FIG. 5.

FIG. 7 is close-up view of the portion contained in box 6 in FIG. 5.

FIG. 18 illustrates an improved filter described herein next to a prior art filter using a nut plate in FIG. 19.

FIG. 19 illustrates a prior art filter using a nut plate.

DETAILED DESCRIPTION

With reference initially to FIGS. 1-7, a spin-on fluid filter 10 in accordance with one embodiment is illustrated. The filter 10 is configured for detachable connection to a filter mounting head 12. As used herein, the term spin-on refers to the use of rotation to effect connection and disconnection of the filter 10 to and from the head 12. However, it is believed that the concepts described herein can be applied to other forms of connection between the filter and the head that do not require rotation.

The fluid filter 10 will be described herein as being configured for filtering oil or fuel such as diesel fuel. However, it is contemplated that the concepts described herein can be utilized on filters that filter others types of fluid, including liquids such as water, and air. In addition, the filter will be described as being configured for outside-in flow of the fluid where the fluid flows generally radially inward through the filter media to a central space and then out through a central outlet. However, the concepts described herein can also be employed on a filter that is configured for inside-out flow of fluid where the fluid flows generally radially outwardly through the media during filtration.

Figure 1:
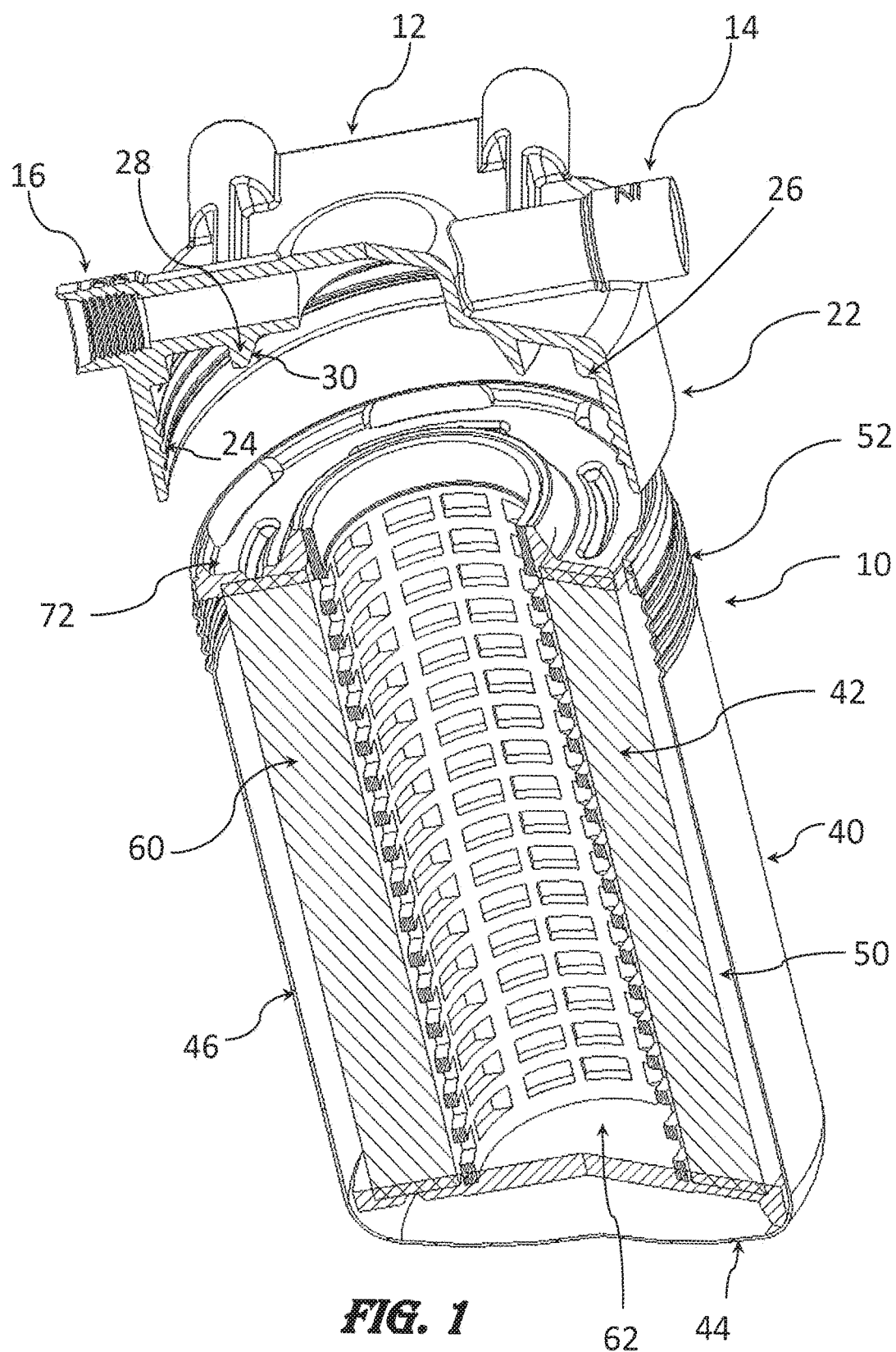
FIG. 1 illustrates an embodiment of the improved filter described herein in position to be mounted to a mounting head.
Figures 2, 3:
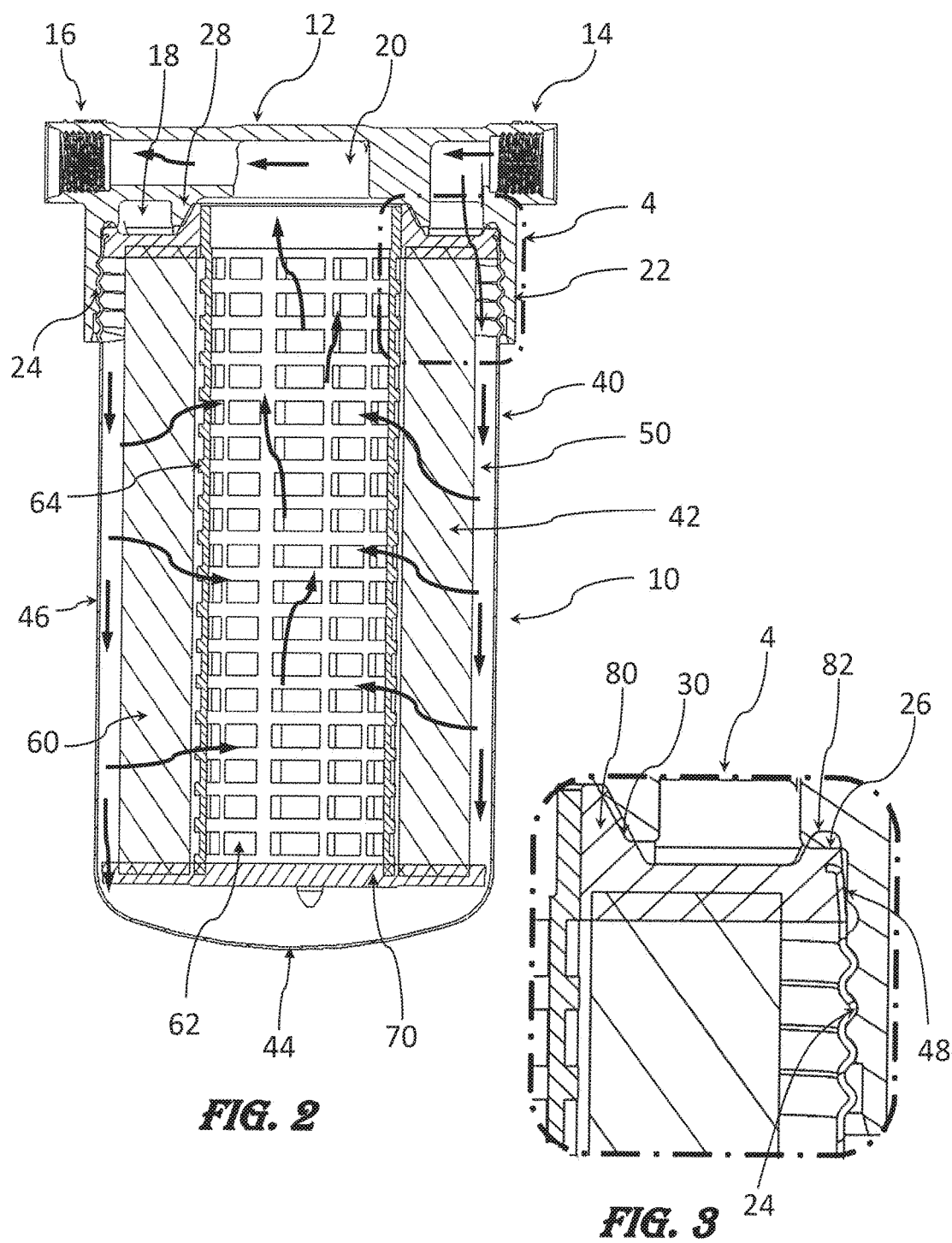
FIG. 2 is a cross-sectional view of the filter of FIG. 1 mounted to the mounting head.
FIG. 3 is close-up view of the portion contained in box 4 in FIG. 2.
Figure 8:
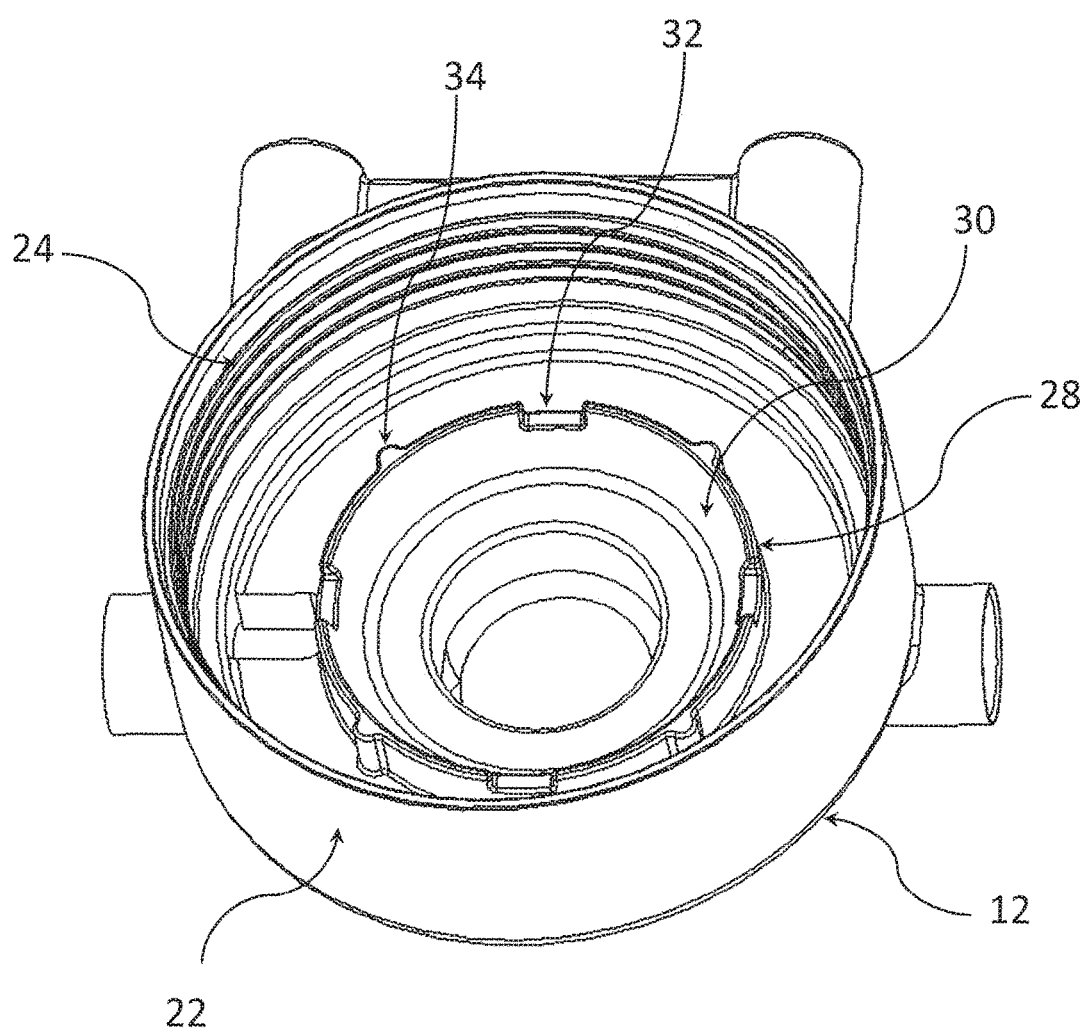
FIG. 8 illustrates the underside of the filter head.

The head 12 includes an inlet 14 for dirty fluid to be filtered by the filter 10, and an outlet 16 for filtered fluid that has been filtered by the filter. The inlet 14 is in communication with an interior circumferential space 18, and the outlet 16 is in communication with an outlet space 20. As shown in FIGS. 1 and 2, the head 12 includes a circumferential skirt 22 with interior threads 24 formed on the interior thereof for use in connecting to the filter 10. A circumferentially continuous sealing surface 26 is formed on the interior of the head adjacent the base end of the skirt 22. In addition, as shown in FIGS. 1, 2 and 8, a sealing rib 28 projects downwardly from the interior of the head toward the filter 10 radially inwardly from the sealing surface 26. The rib 28 has an angled sealing surface 30 that faces generally toward the central axis of the filter. The space 18 is defined between the sealing surface 26 and the rib 28.

The filter head 12 is preferably configured to avoid sealing if one attempts to install an incorrect filter. For example, as shown in FIG. 8, the rib 28 has a plurality of spaced slots 32 provided in it to avoid axial sealing if an incorrectly configured filter is used with the head 12. In addition, the rib 28 is provided with a plurality of half circular tabs 34 to avoid any radial sealing if an incorrectly configured filter is used with the head 12.

Returning to FIGS. 1-5, the filter 10 has two main subassemblies, namely a shell 40 and a filter cartridge 42 that is disposed within the shell. The shell 40 can be formed of metal which allows the shell to be made thin. However, the shell can be formed of other materials, including plastic, if the shell is able to withstand the operating environment, including bearing loads and pressure, of the filter.

The shell 40 has an end wall 44 defining a closed end of the shell, and a side wall 46 extending from the end wall. The side wall 46 has an end 48 opposite the end wall 44 that defines an open end of the shell. The end wall 44 and the sidewall 46 define an interior space 50 of the shell between the closed end and the open end which is sized to receive the filter cartridge 42 therein. As best seen in FIGS. 1-5, the end 48 of the side wall includes exterior threads 52 adjacent the open end that are configured to engage with the threads 24 on the head to connect the filter to the head. In one embodiment, the shell 40 can be an extended shell with the threads 52 formed by a rolling, spinning or other forming operation as per DIN 7273 standard or with any specific thread profile.

The filter cartridge 42 includes filter media 60 that is suitable for filtering the fluid with which the filter will be used. One example of a suitable filter media 60 is a pleated cellulose media. However, other types of filter media can be employed including, but not limited to, multiple media layers and non-pleated media. As described further below, the use of pleated media is advantageous since the use of an end plate that closes the open end of the shell permits an increase in the slit width and the pleat depth of the pleated media, which increases the media area. However, similar increases in media area would be achieved with non-pleated media.

The media 60 is arranged in a generally cylindrical shape and defines an inner space 62. A plastic or metal center tube 64 is disposed in the inner space 62 and supports an interior surface of the filter media 60. The center tube 64 has a first end that is potted in the bottom end plate as described below, and a second end 66 that is surrounded by the upper end plate (described further below) and which helps defines a filtered fluid outlet of the filter.

A first or bottom end plate 70 is attached to a first end of the filter media 60 adjacent to the closed end of the shell. Likewise, a second or upper end plate 72 is attached to a second end of the filter media and is positioned adjacent to and closes the open end of the shell. The end plates 70, 72 seal the ends of the media 60 to prevent fluid from flowing axially through the ends of the media, so all of the fluid flows generally radially through the media.

In the illustrated embodiment, the ends of the media 60 are attached to the end plates 70, 72 using an over molding process where the end plates 70, 72 are molded around the ends of the media and the ends of the center tube. During molding, each end of the media 60 and center tube 64 assembly is placed in a mold cavity. Polyurethane, plastisol, plastic with polyurethane, or other plastic material potting compound is introduced into the cavity and when cured, the ends of the media and the center tube become intimately bonded with the cured material and forms the end plates 70, 72 that are integral structures with the media and the center tube.

However, it is contemplated that the media, center tube and the end plates can be attached in other manners, including by embedding the ends of the media and the center tube into pre-formed endplates, by using an adhesive, or through other suitable attachment means.

For ease of construction, the end plates 70, 72 are preferably formed of the same material. However, the end plates 70, 72 can be formed of different materials if it is necessary or considered beneficial in order to implement the intended sealing functions of the second end plate 72 as discussed further below. The material(s) used to form the end plates can be any material(s) that is suitable to perform the intended functions of the end plates 70, 72. For example, the end plates can be formed of plastisol, polyurethane, a plastic with polyurethane, or other plastic material.

As shown in FIGS. 1-5, the first end plate 70 is closed which means that there are no fluid passageways therethrough. However, in other embodiments, depending upon the intended function of the filter media, one or more openings could be provided at certain locations in the first end plate 70, for example to allow separated water to flow to a sump area. Filters designed with a filter-in-filter construction or filters with hydrophobic media designs typically use this type of end plate with openings construction. A plurality of tabs 71 are formed on the bottom of the end plate 70 during the molding operation. The tabs 71 act as stoppers for the cartridge 42 when it is being inserted into the shell 40. The tabs 71 allow the spring which is normally used in conventional spin on filters to be eliminated. In addition, the tabs 71 also help to locate the cartridge 42 in the shell 40.

Figure 4:
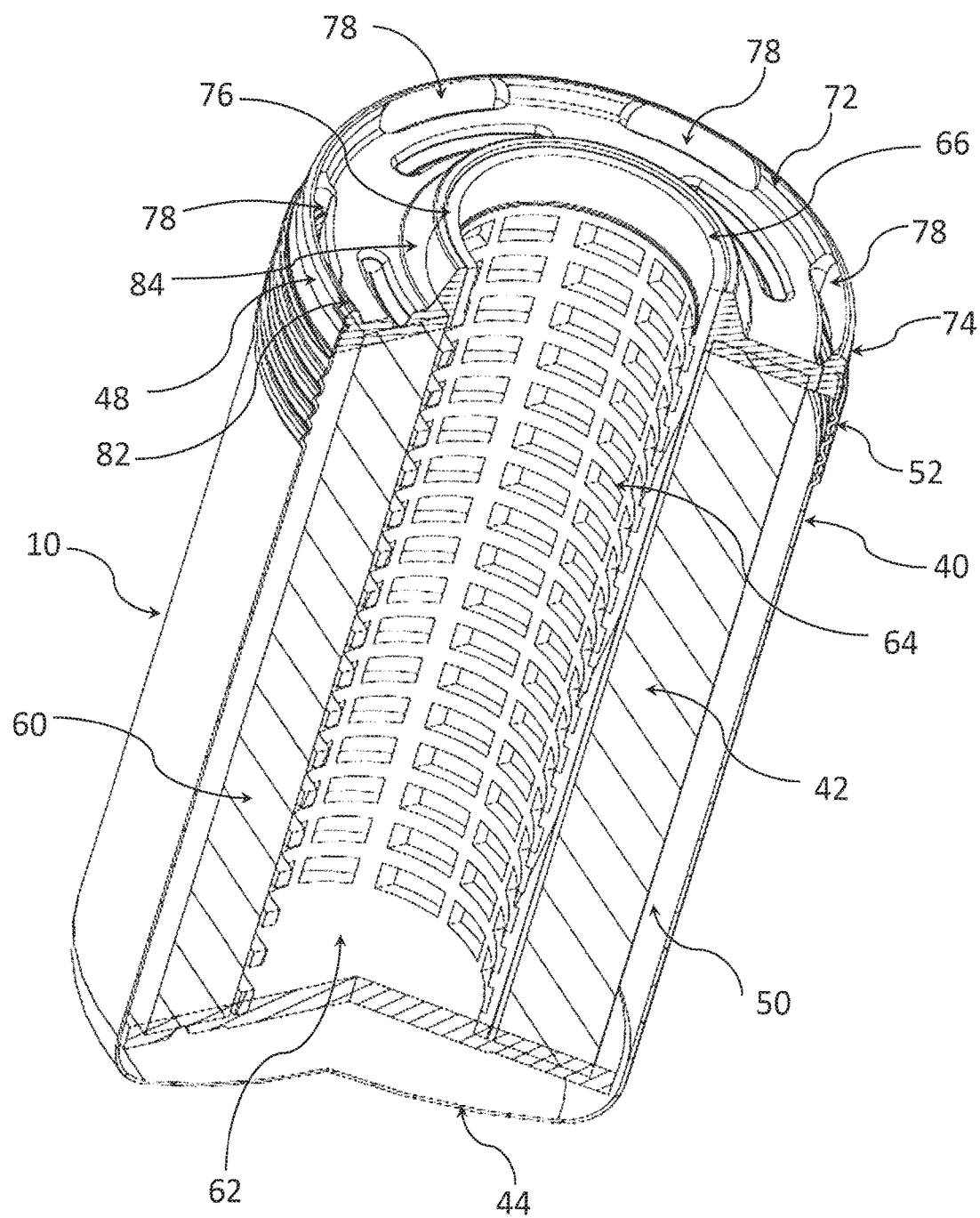
FIG. 4 is a partial sectional view of the filter of FIG. 1.

With reference to FIGS. 4 and 5, the second end plate 72 includes a perimeter edge 74 that is attached to the end 48 of the side wall of the shell, a central filtered fluid outlet passageway 76 in fluid communication with the inner space 62, and a plurality of dirty fluid inlet passageways 78 positioned between the perimeter edge 74 and the central fluid passageway 76 in fluid communication with the interior space 50.

As shown in FIG. 5, the second end plate 72 extends across the entire open end of the shell, closing the open end. As best seen in FIGS. 4 and 5, the perimeter edge 74 is attached to the end 48 by overmolding the second end plate 72 onto the end 48 which fixes the filter cartridge to the shell. Therefore, during the intended use of the filter when it is mounted on the head 12, the only way for fluid to enter the filter 10 is through the passageways 78, and the only way for fluid to exit the filter is through the passageway 76.

In addition to over molding the end plate 72 onto the end 48, the end plate 72 is also molded over the second end 66 of the center tube 64 as discussed above. In addition, the first end plate 70 is also over molded the first end of the center tube 64.

With reference to FIGS. 2-5, the second end plate 72 includes a first seal 80 that is configured to seal with the sealing rib 28 to seal dirty fluid entering the filter from filtered fluid exiting the filter, and a second seal 82 that is configured to seal with the sealing surface 26 to prevent fluid leakage between the filter and the mounting head. The seals 80, 82 are integrally formed with, and formed from the same material used to form, the end plate 72.

The first seal 80 is located adjacent to, and is circumferentially continuous around and defines, the central fluid passageway 76. The first seal 80 includes an angled surface 84 that engages with and seals against the angled surface 30 on the sealing rib as shown in FIGS. 2 and 3. The second end 66 of the center tube 64 provides support to the seal 80. Therefore, angular sealing is achieved by compression of the seal 80 between two solid pennanent parts of the center tube 64 and the angled surface of the sealing rib 28.

This forms the sealing for the clean and dirty side. This angularity in the sealing also provides alignment and it will also compensate for radial variation due to the threads 52 during assembly of the filter 10 with the head 12.

The second seal 82 is located adjacent to or at the perimeter edge 74 and is circumferentially continuous on the second end plate. The second seal 82 is configured to engage and seal against the sealing surface 26 as shown in FIGS. 2 and 3.

Use of the filter 10 is as follows. The filter 10 is brought toward the head 12 as shown in FIG. 1, and then threaded onto the head using the threads 24, 52 as shown in FIG. 2. When completely threaded onto the head, the angled surface 84 of the seal 80 seals against the angled surface 30 of the sealing rib 28, while the seal 82 seals against the sealing surface 26. If an incorrectly designed filter is installed, the filter will not correctly seal against the angled surface 30, and the slots 32 and/or tabs 34 on the rib 28 will permit fluid leakage.

The flow of fluid in the filter is shown by the arrows in FIG. 2. Fluid to be filtered flows into the head via the inlet 14, flows into the space 18, and then flows through the passageways 78 in the end plate 72 into the filter as shown by the arrows. The fluid then flows generally radially inwardly through the filter media, through openings in the center tube and into the inner space 62. The filtered fluid then flows upwardly through the outlet passageway 76, into the space 20 and then exits via the outlet 16.

Figure 9:
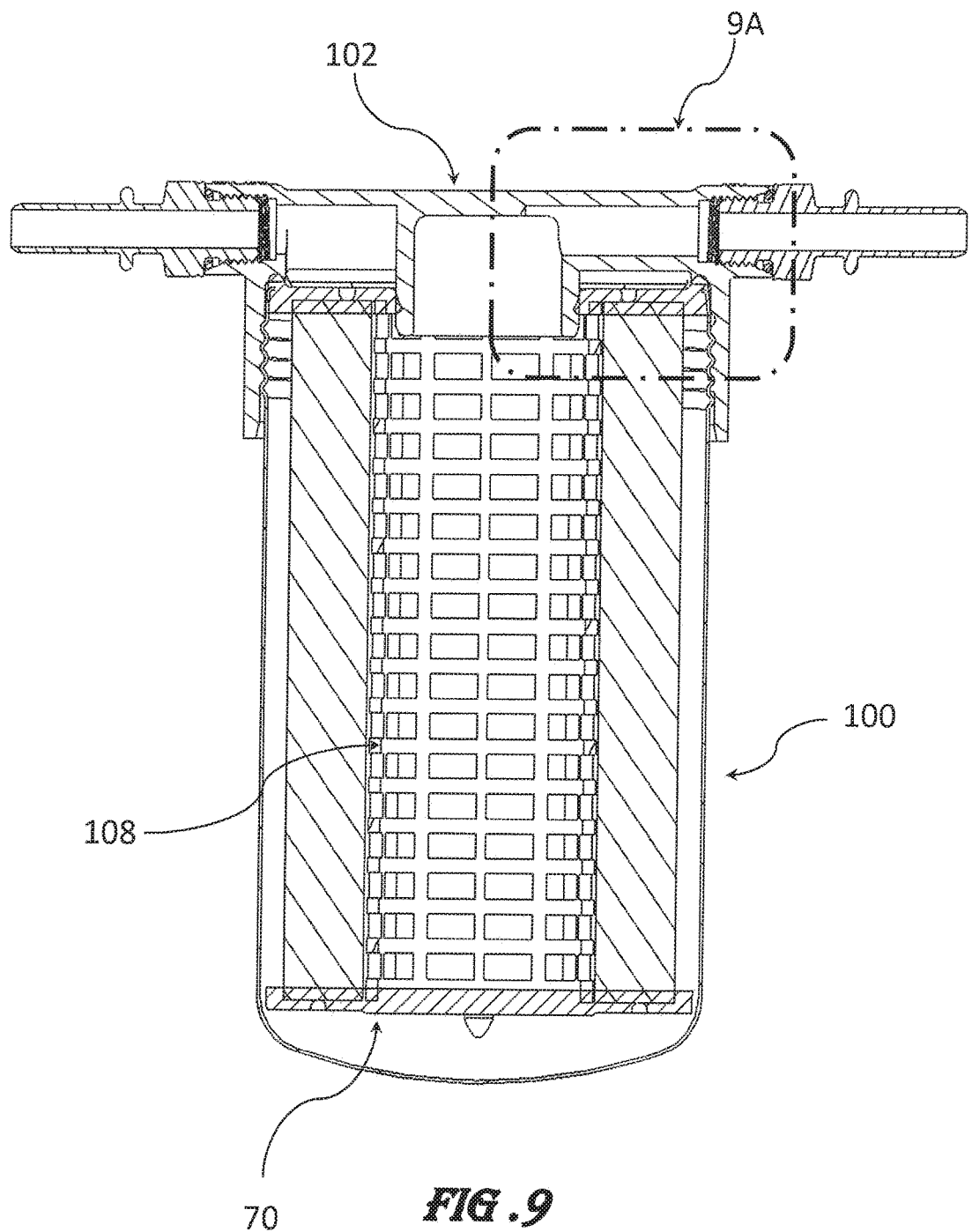
FIG. 9 illustrates another embodiment of an improved filter described herein mounted to a mounting head.
Figure 9A:
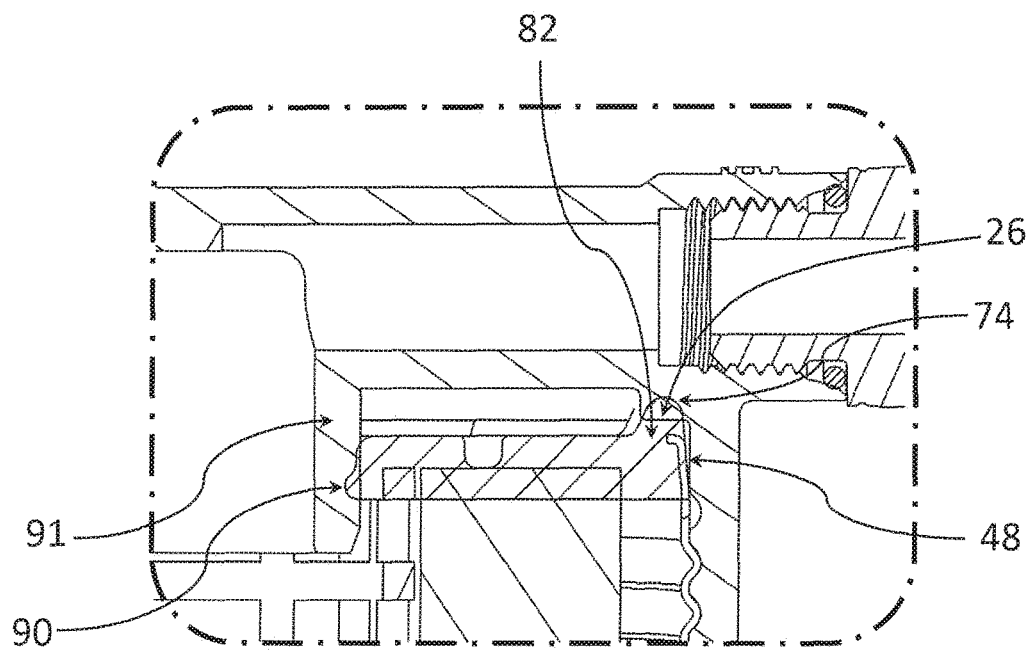
FIG. 9A is a close-up view of the portion contained in box 9A in FIG. 9.
Figure 9B:
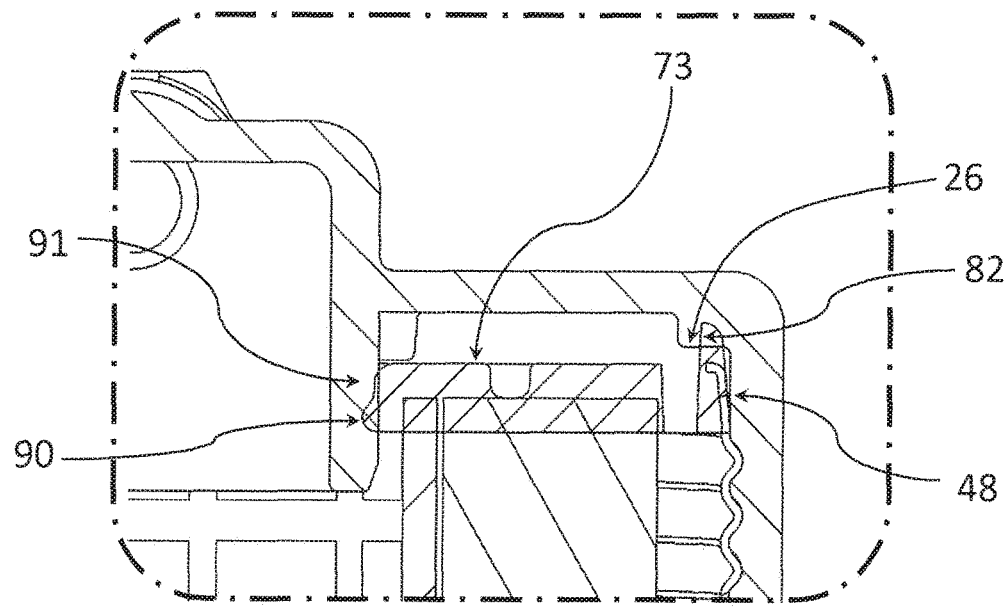
FIG. 9B is a close-up view similar to FIG. 9A, but taken through one of the inlet openings in the end plate.

FIGS. 9, 9A and 9B illustrate another embodiment of a filter 100 which is similar in many respects to the filter 10. Therefore, only the differences from the filter 10 will be described in detail, and features that are similar to features in the filter 10 will be designated with the same reference numerals. As shown in FIG. 9, the head 102 is configured similar to the head 12 with respect to the fluid inlet and the sealing surface 26.

The filter 100 primarily differs from the filter 10 with respect to the center tube and fluid outlet design. The second end plate 73 includes a first seal 90 that is configured for radial sealing with an outlet tube 91 of the head while the seal 82 seals against the sealing surface 26. In addition, the filter 100 includes a center tube 108 where the first end is embedded in the first end plate 70 as in the filter 10. However, the second end of the center tube 108 is simply potted into the second end plate 73 at a location between the seal 90 and the seal 82 as best seen in FIGS. 9A and 9B.

As shown in FIGS. 9A and 9B, the perimeter edge 74 of the end plate 73 is attached to the end 48 of the shell by overmolding the second end plate 73 onto the end 48 which fixes the filter cartridge to the shell.

Figure 10:
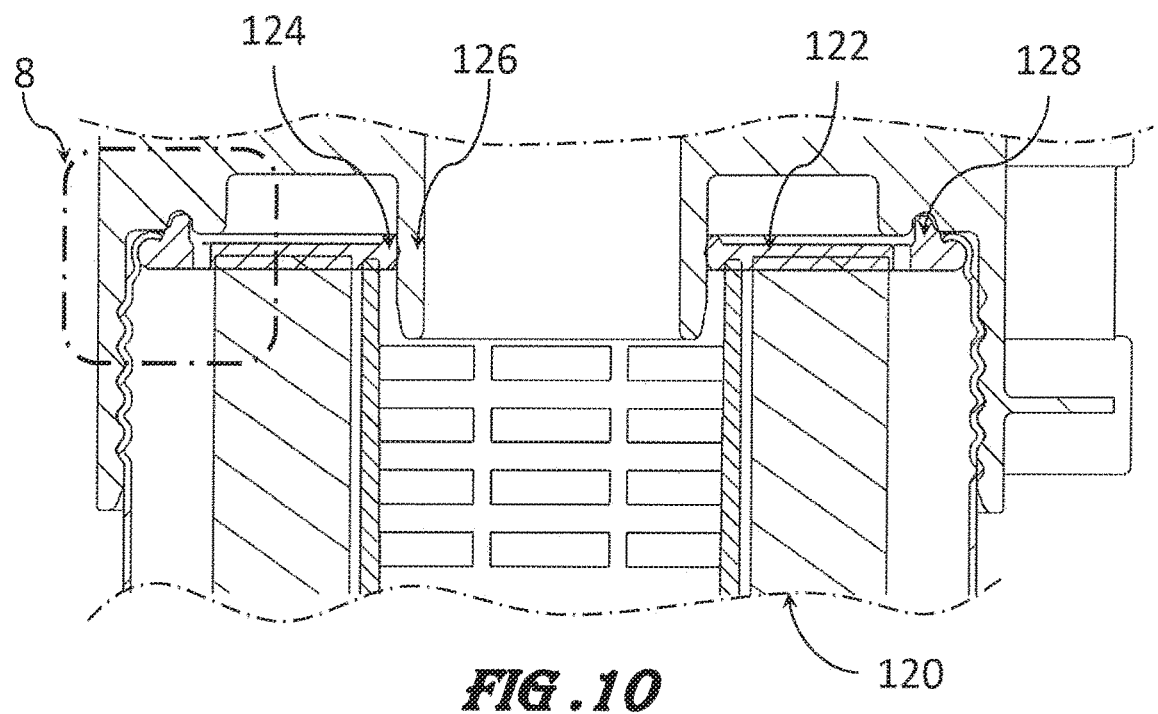
FIG. 10 illustrates another embodiment of an improved filter described herein mounted to a mounting head.
Figure 11:
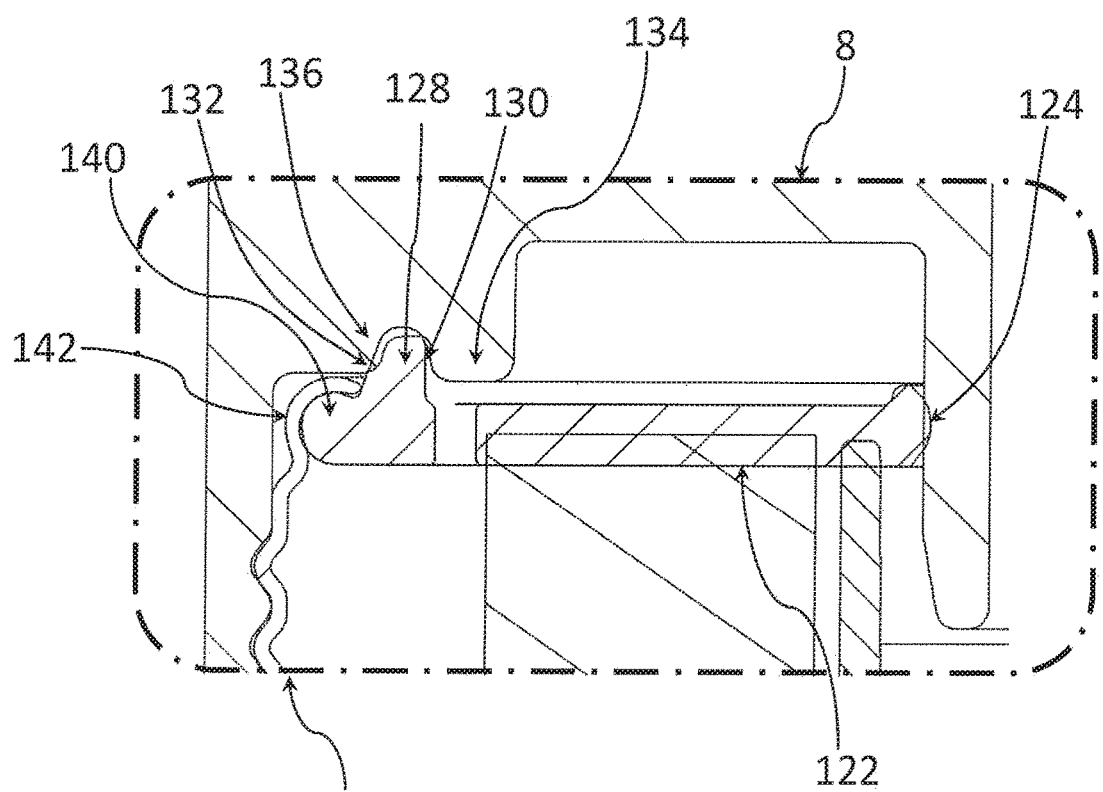
FIG. 11 is a close-up view of the portion contained in box 8 in FIG. 10.

FIGS. 10 and 11 illustrate an embodiment of a filter 120 that employs a differently configured second end plate 122. The end plate 122 includes a first seal 124 that is configured for radial sealing with an outlet tube 126 of the head. The end plate 122 also includes a second seal 128 formed by an axially projecting rib with an inner surface 130, and an angled outer surface 132. The seal 128 fits into a channel formed in the head between an inner rib 134 and an outer rib 136. The angled outer surface 132 engages and seals against an angled surface on the outer rib 136, while the inner surface 130 seals against a surface of the inner rib 134.

In addition, the end plate 122 includes a perimeter edge 140 that is shaped as a circumferentially continuous rounded bead. The beaded edge 140 is configured to snap fit connect with a rounded end 142 of the shell. This snap fit connection would permit replacement of the filter cartridge at the end of its useful life. Instead of a snap fit connection, the end 142 and the perimeter edge 140 can be spin welded together. Spin welding of filter parts is known in the art.

Figure 12:
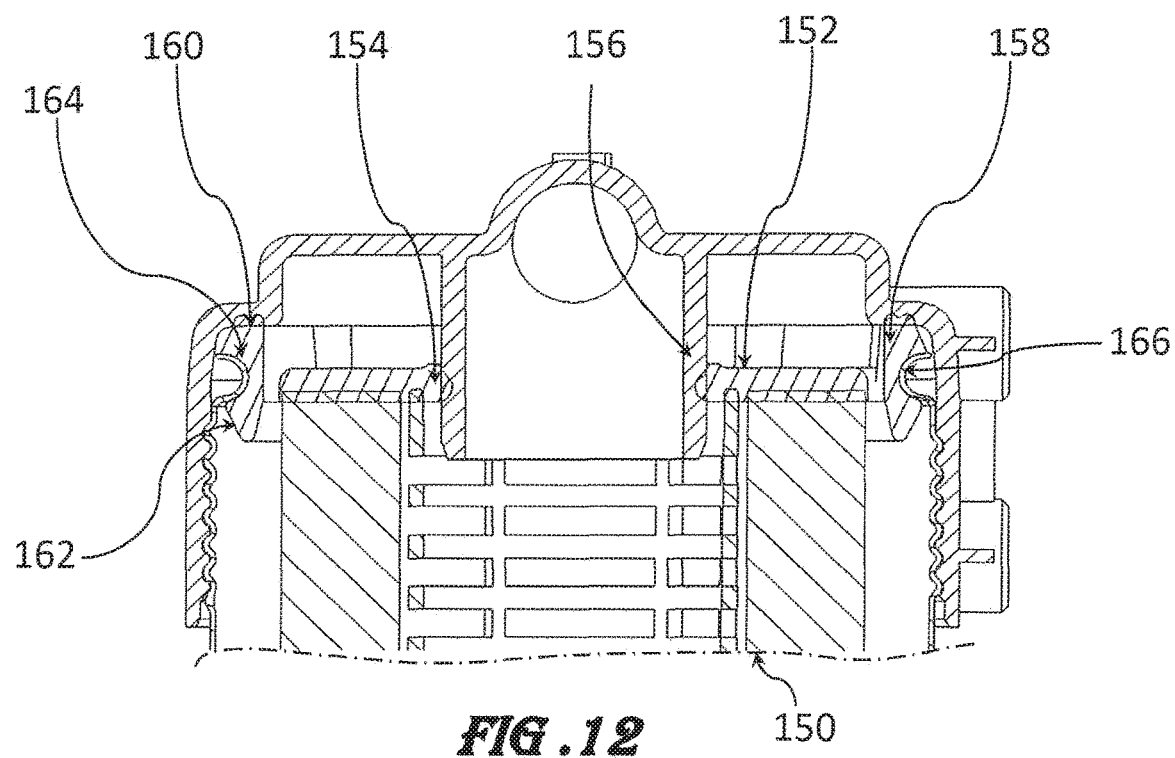
FIG. 12 illustrates another embodiment of an improved filter described herein mounted to a mounting head.

FIG. 12 illustrates an embodiment of a filter 150 that employs a differently configured second end plate 152. In this embodiment, the end plate 152 includes a first seal 154 that is configured for radial sealing with an outlet tube 156 of the head. The end plate 152 also includes a second seal 158 that engages and seals against a sealing surface 160 that is similar to the sealing surface 26 in FIG. 9A. In addition, the end plate 152 includes a perimeter edge 162 that includes a circumferentially continuous, radial groove 164 that is configured to snap fit connect with a rounded end 166 of the shell. This snap fit connection would pennit replacement of the filter cartridge at the end of its useful life. Instead of a snap fit connection, the end 166 and the perimeter edge 162 can be spin welded together.

Figure 13:
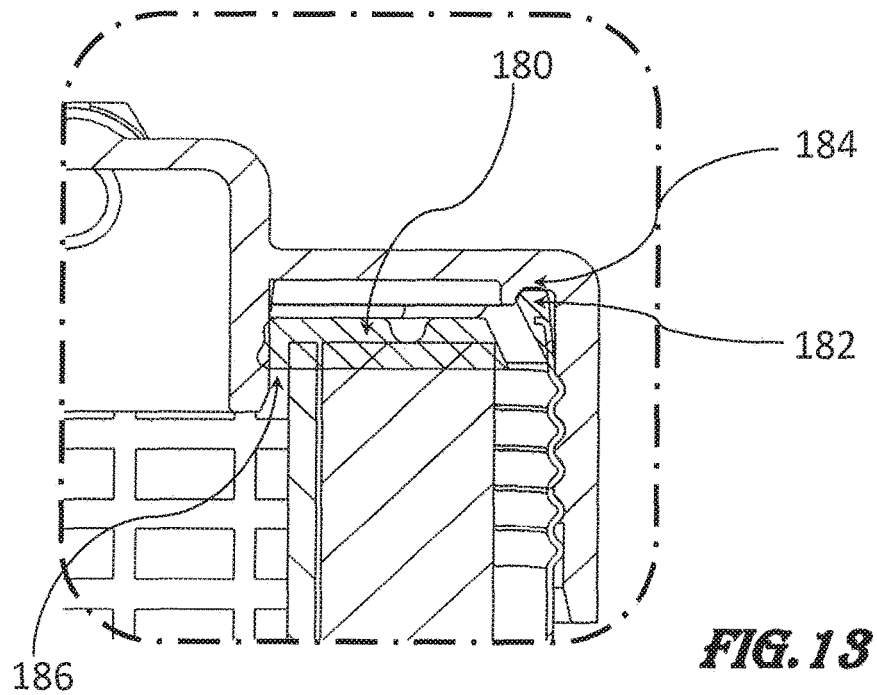
FIG. 13 is a close-up view of another embodiment of sealing between the head and the filter.

FIG. 13 illustrates another embodiment of a second end plate 180 with a second seal 182 that has a rounded edge 184 that engages and seals with a rounded sealing surface on the head. A first seal 186 is configured for radial sealing with an outlet tube of the head.

Figure 14:
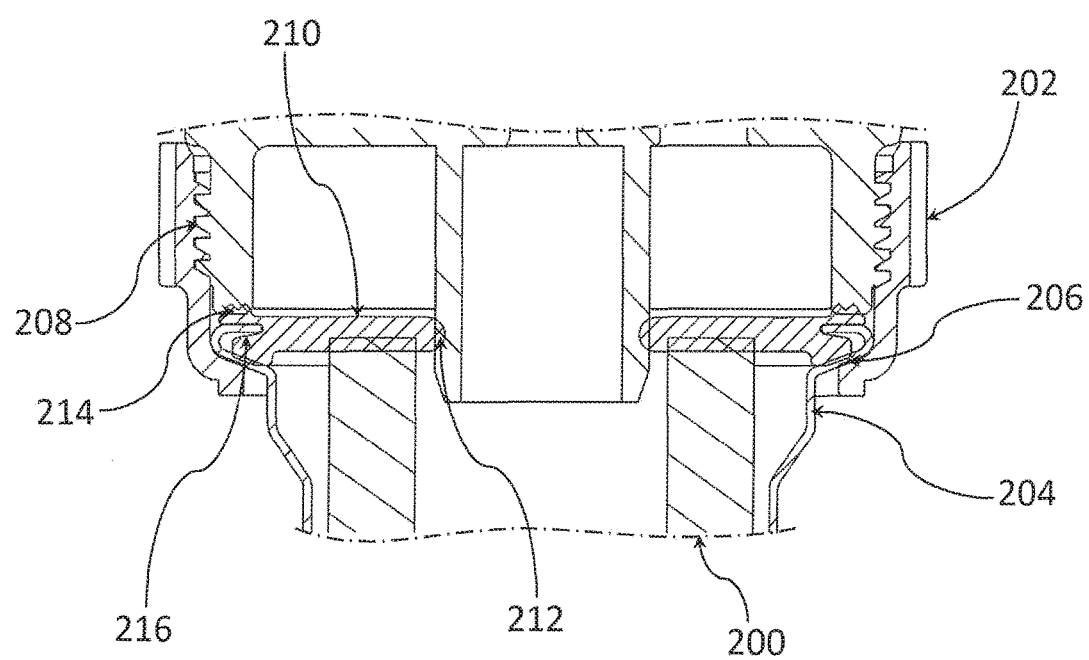
FIG. 14 illustrates another embodiment of an improved filter described herein mounted to a mounting head.
Figure 15:
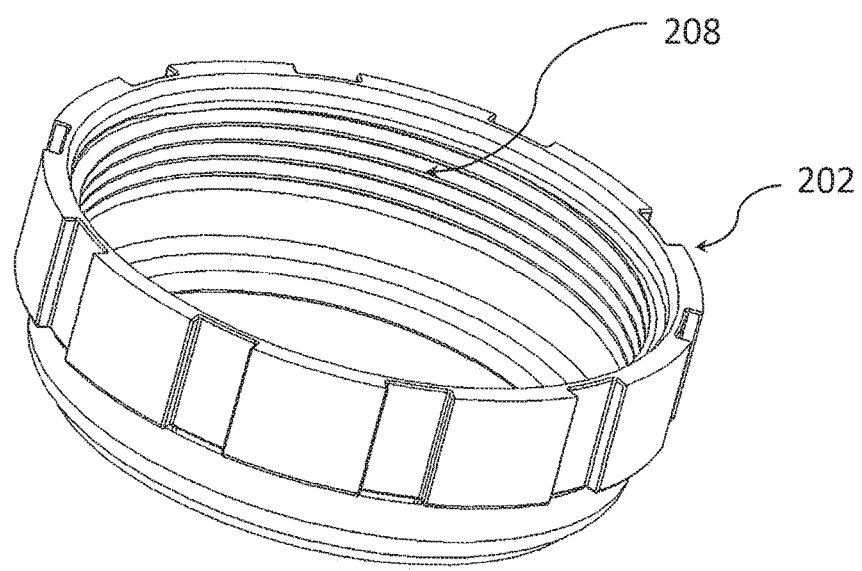
FIG. 15 illustrates a cap used to mount the filter of FIG. 14 to the head.

FIGS. 14 and 15 illustrate an embodiment of a filter 200 where the threads that connect the filter 200 to the head are formed on an attachment cap 202 disposed adjacent to the open end of the filter and that is rotatable relative to the shell. An upper end 204 of the shell is flared outwardly and defines a shelf 206. The cap 202 includes a bottom end that engages the shelf 206, and an upper end that is internally threaded 208 for engagement with exterior threads on the head.

The filter 200 also includes a second end plate 210 with a first seal 212 that is configured similar to the first seal 154 in FIG. 12, and a second seal 214 at a perimeter edge 216. The perimeter edge 216 defines a radial slot that receives the end of the shell, where the second seal 214 defines the upper side of the slot and which seals with a sealing surface on the head. This construction permits the end plate 210 to be snap fitted into the shell. Alternatively, the end of the shell and the end plate 210 can be spin welded together. Also, the attachment cap 202 is loosely fitted on the end of the filter 200. This permits the filter to be removed from the attachment cap 202 to allow replacement of the filter 200.

Figure 16:
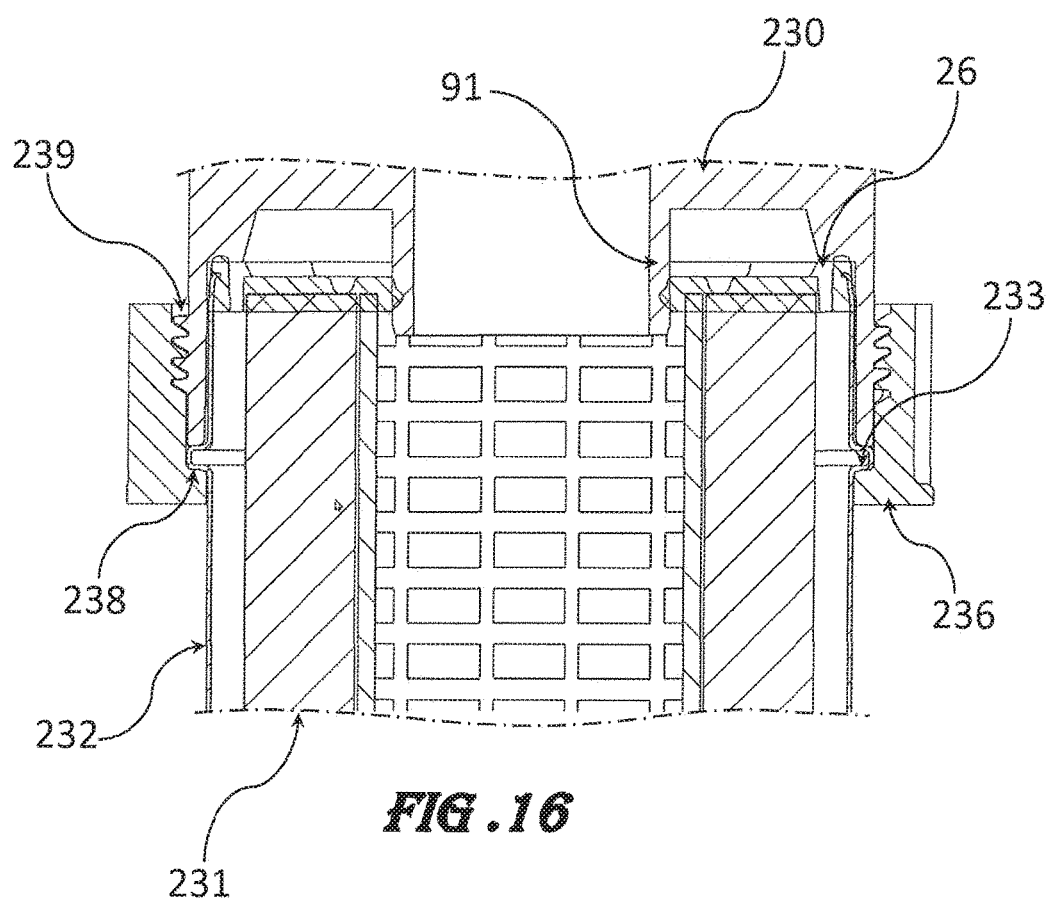
FIG. 16 illustrates another embodiment of an improved filter described herein mounted to a mounting head.
Figure 17:
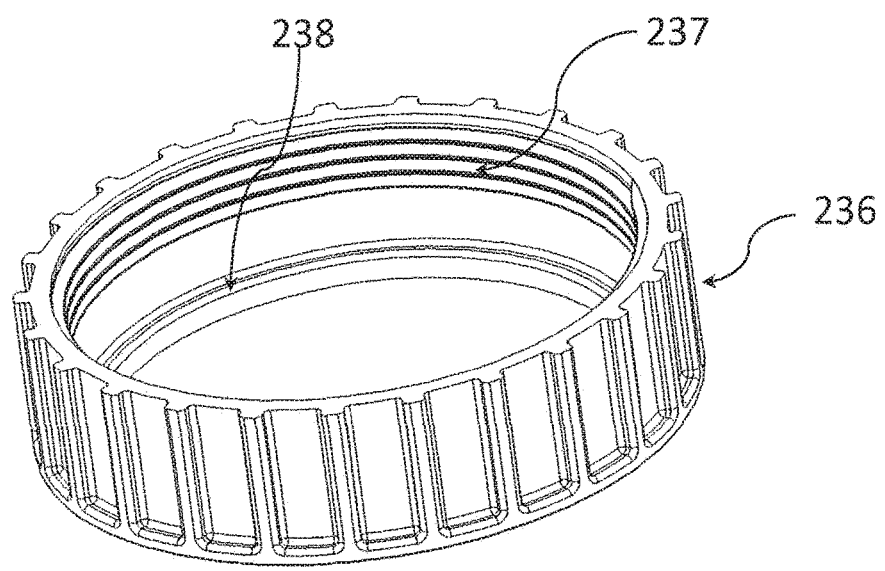
FIG. 17 illustrates another embodiment of a cap used to mount the filter of FIG. 16 to the head.

FIGS. 16 and 17 illustrate another embodiment of a filter 231 which is similar in many respects to the filter 100 in FIG. 9. Therefore only differences from the filter 100 will be described in detail and features that are similar to features in the filter 100 will be designated with same reference numerals. As shown in FIG. 16, the head 230 is configured similar to the head 102 shown in FIGS. 9, 9A and 9B, including fluid inlet and fluid outlet, and a similar sealing surface 26 and outlet tube 91.

The filter 231 primarily differs from the filter 100 with respect to the shell, which has no threads formed on it, and the connecting arrangement that connects the filter 231 to the filter head 230. The filter 231 is connected to the head 230 in a similar manner to the filter 200 as shown in FIG. 14, where the threads that connect the filter 231 to the head 230 are formed on an attachment cap 236 disposed adjacent to the open end of the filter shell 232 and that is rotatable relative to the shell. The cap 236 includes a bottom end 238 that engages a shelf 233 formed on the shell 232 and an upper end that is internally threaded 237 for engagement with exterior threads 239 on the head 230.

The lower, non-illustrated portions of the filters in FIGS. 10-14 and 16 can be similar to the lower filter portions illustrated in FIGS. 1-2 and 9, or they can have a different configuration than in FIGS. 1-2 and 9.

With reference to FIGS. 18 and 19, a filter 250 constructed in accordance with the concepts described herein is illustrated next to a prior art filter 300 that uses a nut plate. As described above, the filter 250 has two main subassemblies, namely a shell and a filter cartridge, where the filter cartridge comprises filter media, a center tube, a molded bottom endplate and a molded top endplate that is fixed at its perimeter edge to the shell to close the open end of the shell and which defines first and second seals. Avoiding the nut plate allows more space availability at the top of the filter, which can be used to increase the slit width of the filter media (shown in FIG. 5) resulting in increased filter media area, or used to reduce the axial length of the filter. In addition, since the molded top end plate extends to and closes the open end of the shell, the pleat depth of the filter media (shown in FIG. 5) can be increased, resulting in increased filter media area.

In contrast, the prior art filter 300 includes all of the components listed in FIG. 19. In addition, the presence of the nut plate results in an increase in the axial length of the filter 300 compared to the axial length of the filter 250.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A spin-on filter comprising:
a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes threads adjacent the open end configured to connect the shell to a mounting head;
a filter cartridge disposed in the interior space of the shell, the filter cartridge including:
filter media suitable for filtering a fluid, the filter media defining an inner space;
a center tube in the inner space and supporting an interior surface of the filter media;
a first, closed end plate attached to a first end of the filter media, the closed end plate is adjacent to the closed end of the shell;

a second end plate attached to a second end of the filter media, the second end plate is positioned adjacent to and closes the open end of the shell;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the end of the side wall is rounded toward the filter cartridge, and wherein the perimeter edge of the second end plate comprises a circumferentially continuous bead configured for a snap fit engagement to the end of the side wall.

2. The filter of claim 1, wherein an end of the center tube is potted into the second end plate between the first and second seals.

3. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes threads adjacent the open end configured to connect the shell to a mounting head;

a filter cartridge disposed in the interior space of the shell, the filter cartridge including:

filter media suitable for filtering a fluid, the filter media defining an inner space;

a center tube in the inner space and supporting an interior surface of the filter media;

a first, closed end plate attached to a first end of the filter media, the closed end plate is adjacent to the closed end of the shell;

a second end plate attached to a second end of the filter media, the second end plate is positioned adjacent to and closes the open end of the shell;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the second end plate is overmolded onto the end of the side wall of the shell.

4. The filter of claim 3, wherein the second end plate is overmolded onto an end of the center tube.

5. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes threads adjacent the open end configured to connect the shell to a mounting head;

a filter cartridge disposed in the interior space of the shell, the filter cartridge including:

filter media suitable for filtering a fluid, the filter media defining an inner space;

a center tube in the inner space and supporting an interior surface of the filter media;

a first, closed end plate attached to a first end of the filter media, the closed end plate is adjacent to the closed end of the shell;

a second end plate attached to a second end of the filter media, the second end plate is positioned adjacent to and closes the open end of the shell;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the second seal comprises an axially projecting rib with an inner surface configured for engagement to an inner rib of a mounting head and an angled outer surface configured for engagement to an outer rib of the mounting head.

6. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes threads adjacent the open end configured to connect the shell to a mounting head;

a filter cartridge disposed in the interior space of the shell, the filter cartridge including:

filter media suitable for filtering a fluid, the filter media defining an inner space;

a center tube in the inner space and supporting an interior surface of the filter media;

a first, closed end plate attached to a first end of the filter media, the closed end plate is adjacent to the closed end of the shell;

a second end plate attached to a second end of the filter media, the second end plate is positioned adjacent to and closes the open end of the shell;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the end of the side wall is rounded away from the filter cartridge, and wherein the perimeter edge of the second end plate comprises a circumferentially continuous radial groove configured for a snap fit engagement to the rounded end of the side wall.

7. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes threads adjacent the open end configured to connect the shell to a mounting head;

a filter cartridge disposed in the interior space of the shell, the filter cartridge including:

filter media suitable for filtering a fluid, the filter media defining an inner space;

a center tube in the inner space and supporting an interior surface of the filter media;

a first, closed end plate attached to a first end of the filter media, the closed end plate is adjacent to the closed end of the shell;

a second end plate attached to a second end of the filter media, the second end plate is positioned adjacent to and closes the open end of the shell;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the second seal comprises a rounded edge configured for engagement to a rounded sealing surface of the mounting head.

8. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes structure adjacent the open end configured to connect the shell to a mounting head;

a filter cartridge disposed in the interior space of the shell, the filter cartridge including:

filter media suitable for filtering a fluid, the filter media defining an inner space;

a first end plate attached to a first end of the filter media, the first end plate is adjacent to the closed end of the shell, and the first end plate seals the first end of the filter media;

a second end plate attached to a second end of the filter media, the second end plate is positioned adjacent to and closes the open end of the shell, and the second end plate seals the second end of the filter media;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the second end plate is overmolded onto the end of the side wall of the shell.

9. The spin-on filter of claim 8, further comprising a center tube in the inner space, the center tube extends from the first end plate to the second end plate, and the center tube has a first end and a second end that are molded with the first end plate and the second end plate, respectively.

10. The filter of claim 9, wherein the second end plate is overmolded onto an end of the center tube.

11. The filter of claim 9, wherein an end of the center tube is potted into the second end plate between the first and second seals.

12. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes structure adjacent the open end configured to connect the shell to a mounting head;

a filter cartridge disposed in the interior space of the shell, the filter cartridge including:

filter media suitable for filtering a fluid, the filter media defining an inner space;

a first end plate attached to a first end of the filter media, the first end plate is adjacent to the closed end of the shell, and the first end plate seals the first end of the filter media;

a second end plate attached to a second end of the filter media, the second end plate is positioned adjacent to and closes the open end of the shell, and the second end plate seals the second end of the filter media;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the second seal comprises an axially projecting rib with an inner surface configured for engagement to an inner rib of a mounting head and an angled outer surface configured for engagement to an outer rib of the mounting head.

13. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes structure adjacent the open end configured to connect the shell to a mounting head;

a filter cartridge disposed in the interior space of the shell, the filter cartridge including:

filter media suitable for filtering a fluid, the filter media defining an inner space;

a first end plate attached to a first end of the filter media, the first end plate is adjacent to the closed end of the shell, and the first end plate seals the first end of the filter media;

a second end plate attached to a second end of the filter media, the second end plate is positioned adjacent to and closes the open end of the shell, and the second end plate seals the second end of the filter media;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the end of the side wall is rounded toward the filter cartridge, and wherein the perimeter edge of the second end plate comprises a circumferentially continuous bead configured for a snap fit engagement to the end of the side wall.

14. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes structure adjacent the open end configured to connect the shell to a mounting head;

a filter cartridge disposed in the interior space of the shell, the filter cartridge including:

filter media suitable for filtering a fluid, the filter media defining an inner space;

a first end plate attached to a first end of the filter media, the first end plate is adjacent to the closed end of the shell, and the first end plate seals the first end of the filter media;

a second end plate attached to a second end of the filter media, the second end plate is positioned adjacent to and closes the open end of the shell, and the second end plate seals the second end of the filter media;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the end of the side wall is rounded away from the filter cartridge, and wherein the perimeter edge of the second end plate comprises a circumferentially continuous radial groove configured for a snap fit engagement to the rounded end of the side wall.

15. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall includes structure adjacent the open end configured to connect the shell to a mounting head;

a filter cartridge disposed in the interior space of the shell, the filter cartridge including:

filter media suitable for filtering a fluid, the filter media defining an inner space;

a first end plate attached to a first end of the filter media, the first end plate is adjacent to the closed end of the shell, and the first end plate seals the first end of the filter media;

a second end plate attached to a second end of the filter media, the second end plate is positioned adjacent to and closes the open end of the shell, and the second end plate seals the second end of the filter media;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head, wherein the second seal comprises a rounded edge configured for engagement to a rounded sealing surface of the mounting head.

16. A spin-on filter comprising:

a shell having an end wall defining a closed end of the shell, and a side wall extending from the end wall, the side wall having an end opposite the end wall that defines an open end of the shell, the end wall and the side wall defining an interior space of the shell between the closed end and the open end, the end of the side wall defines a shelf adjacent the open end;

a filter cartridge disposed in the interior space of the shell, the filter cartridge including:

filter media suitable for filtering a fluid, the filter media defining an inner space;

a center tube in the inner space and supporting an interior surface of the filter media;

a first, closed end plate attached to a first end of the filter media, the closed end plate is adjacent to the closed end of the shell;

a second end plate attached to a second end of the filter media, the second end plate is positioned adjacent to and closes the open end of the shell;

the second end plate includes a perimeter edge attached to the end of the side wall of the shell, a central fluid passageway in fluid communication with the inner space, and a plurality of fluid passageways positioned between the perimeter edge and the central fluid passageway in fluid communication with the interior space; and the second end plate includes first and second seals integrally formed therewith, the first seal is located adjacent to and is circumferentially continuous around the central fluid passageway to enable sealing with the mounting head to seal dirty fluid entering the filter from filtered fluid exiting the filter; the second seal is located adjacent to the perimeter edge and is circumferentially continuous on the second end plate to enable sealing with the mounting head to prevent fluid leakage between the filter and the mounting head; and an attachment cap removably coupled to the shelf of the shell at a first attachment cap end and comprising structure at a second attachment cap end configured to connect to the mounting head.

17. The filter of claim 16, wherein the perimeter edge defines a radial slot configured to receive the end of the side wall of the shell, wherein the second seal defines an upper side of the slot.

18. The filter of claim 16, wherein the structure at the second attachment cap end comprises threads.

* * * * *